(12) United States Patent
Liu et al.

(10) Patent No.: US 11,768,168 B2
(45) Date of Patent: Sep. 26, 2023

(54) SENSOR AND METHOD FOR MANUFACTURING SAME

(71) Applicant: NGK SPARK PLUG CO., LTD., Nagoya (JP)

(72) Inventors: Sunchao Liu, Nagoya (JP); Takehiro Oba, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 211 days.

(21) Appl. No.: 16/986,483

(22) Filed: Aug. 6, 2020

(65) Prior Publication Data
US 2021/0041393 A1    Feb. 11, 2021

(30) Foreign Application Priority Data
Aug. 7, 2019    (JP) .................. 2019-145359

(51) Int. Cl.
*G01N 27/406* (2006.01)
*G01N 27/407* (2006.01)
*G01M 15/10* (2006.01)

(52) U.S. Cl.
CPC ...... *G01N 27/4062* (2013.01); *G01M 15/104* (2013.01); *G01N 27/407* (2013.01)

(58) Field of Classification Search
CPC ............ G01N 27/4062; G01N 27/407; G01N 27/4071; G01N 33/0036; G01M 15/104
See application file for complete search history.

(56) References Cited

U.S. PATENT DOCUMENTS

| | | | | |
|---|---|---|---|---|
| 6,383,353 | B1 * | 5/2002 | Akatsuka ............ | G01N 27/407 204/427 |
| 2002/0017127 | A1 * | 2/2002 | Nakano ............... | G01N 27/4062 73/31.05 |
| 2005/0040039 | A1 * | 2/2005 | Kojima ............... | G01N 27/4071 204/424 |
| 2009/0223818 | A1 * | 9/2009 | Matsui ............... | G01N 27/4062 204/412 |
| 2013/0205872 | A1 * | 8/2013 | Katou ................ | G01N 27/4077 73/31.07 |
| 2014/0299469 | A1 * | 10/2014 | Oba .................... | G01N 27/407 204/412 |
| 2017/0307478 | A1 * | 10/2017 | Oba .................... | G01M 15/104 |
| 2018/0003669 | A1 * | 1/2018 | Nagata ................ | G01N 27/304 |
| 2018/0011049 | A1 * | 1/2018 | Oba .................... | G01N 27/4062 |

FOREIGN PATENT DOCUMENTS

JP    2018-013476 A    1/2018

* cited by examiner

*Primary Examiner* — Joshua L Allen
*Assistant Examiner* — Shizhi Qian
(74) *Attorney, Agent, or Firm* — Sughrue Mion, PLLC (57) ABSTRACT

A sensor (1) comprising: a sensor element (10); metal terminals; and a front side separator (90) and a rear side separator (95) to hold the metal terminals, the metal terminals each include a front side metal terminal (30) and a rear side metal terminal (40) respectively held by the front side separator and the rear side separator, a first connection portion (33) is provided on a rear side of the front side metal terminal, a second connection portion (43) is provided on a front side of the rear side metal terminal, and an axis P2 of one of the first and the second connection portion, in all of the plurality of metal terminals, is displaced toward a radially outer side of the sensor element relative to an axis P1 of a counterpart thereof, and the first connection portion and the second connection portion are in contact with each other.

9 Claims, 8 Drawing Sheets

SENSOR AND METHOD FOR MANUFACTURING SAME

BACKGROUND OF THE INVENTION

1. Field of the Invention

The present invention relates to a sensor such as a sensor that detects the concentration of a detection target gas, and a method for manufacturing the sensor.

2. Description of the Related Art

As a sensor that detects the concentration of oxygen or NOx in exhaust gas of an automobile or the like, a sensor that has a sensor element using a solid electrolyte is known.

As a sensor of this type, widely used is a sensor in which: a plurality of electrode pads are provided at the outer surface on the rear side of a sensor element; a metal terminal is set to electrically contact each of the electrode pads, to externally transmit a sensor output signal from the sensor element; and power is supplied to a heater stacked on the sensor element. As such a metal terminal, a metal terminal in which a male-type terminal member is fitted to a female-type terminal member, and the fitting portion thereof is welded, is also known (Patent Document 1). The terminal members are respectively held by two ceramic separators, and the separators are coupled to each other in the front-rear direction.

[Patent Document 1] Japanese Patent Application Laid-Open (kokai) No. 2018-13476 (FIG. 7)

3. Problems to be Solved by the Invention

When the male-type terminal member and the female-type terminal member are fitted to each other, if a gap is formed therebetween, welding cannot be performed. Meanwhile, in order to fit the male member and the female member to each other, the male member needs to have a smaller diameter than the female member, resulting in a gap therebetween.

Thus, in the technology of Patent Document 1, a strip-like terminal contact portion that presses, when the male-type terminal member is inserted, the male-type terminal member against the inner wall of the female-type terminal member, is provided on the inner surface side of the female-type terminal member.

However, when the strip-like terminal contact portion is provided to the terminal member, an extra step is required in manufacturing the terminal. This could cause reduced productivity. In addition, when the spring force of the terminal contact portion is insufficient or when the terminal contact portion has undergone plastic deformation, the force of pressing the male-type terminal member becomes insufficient. This could cause formation of a gap between the terminals.

Therefore, an object of the present invention is to provide a sensor and a method for manufacturing the same that can easily and assuredly inhibit formation of a gap in the fitting portion of two metal terminals respectively held by two separators.

SUMMARY OF THE INVENTION

The above object has been achieved in a first aspect of the invention by providing (1) a sensor comprising: a sensor element extending in an axial direction; a plurality of metal terminals configured to be electrically connected to the sensor element; and a separator having a tubular shape, the separator being configured to surround a rear side of the sensor element and configured to hold the metal terminals. The separator includes a front side separator and a rear side separator respectively disposed on a front side and a rear side in the axial direction, the metal terminals each include a front side metal terminal and a rear side metal terminal respectively held by the front side separator and the rear side separator, a first connection portion that is a male terminal or a female terminal is provided on a rear side of the front side metal terminal, a second connection portion that is a male terminal or a female terminal and that serves as a counterpart terminal to be fitted to the first connection portion is provided on a front side of the rear side metal terminal. Further, an axis of one of the first connection portion and the second connection portion, in all of the plurality of metal terminals, is displaced toward a radially outer side of the sensor element relative to an axis of a counterpart thereof, and the first connection portion and the second connection portion are in contact with each other.

According to the above sensor (1), the axis of one of the two types of connection portions, in all of the plurality of metal terminals, is displaced toward the radially outer side of the sensor element relative to the axis of the counterpart, and both are in contact with each other. Therefore, formation of a gap in the fitting portion of the two types of metal terminals can be easily and assuredly inhibited. As a result, connection reliability of the two types of metal terminals can be improved, and when the metal terminals are to be welded, welding can be assuredly performed.

In a preferred embodiment (2) of the sensor (1) above, one of each first connection portion and each second connection portion is the male terminal, and an axis of the male terminal, in all of the plurality of metal terminals, is displaced toward the radially outer side relative to an axis of a counterpart thereof.

According to the sensor (2) above, out of the first connection portion and the second connection portion, the male terminal that is on the inner side of the female terminal is positioned closer to the radially outer side. Thus, the contact portion of the two types of connection portions faces the radially outer side without fail. Therefore, even when the plurality of metal terminals are arranged, each contact portion faces the outer side. Thus, when the contact portion is to be welded, the welding operation does not interfere with another metal terminal, and welding can be easily performed.

In another preferred embodiment (3) of the sensor (2) above, the first connection portion and the second connection portion are welded to each other at a contact portion.

According to the sensor (3) above, electric connection between the first connection portion and the second connection portion is assured, and connection reliability between the two types of metal terminals is improved.

In yet another preferred embodiment (4) of the sensor of any of (1) to (3) above, when, viewed in the axial direction, a predetermined line segment that passes through a center of gravity of the sensor element and that does not pass through the first connection portions and the second connection portions is drawn, all of the axes of one of the first connection portions and the second connection portions are displaced so as to be set apart from the line segment relative to the axes of the counterparts thereof.

According to the sensor (4) above, when the line segment is drawn, all of the axes of one of the two types of connection portions are displaced so as to be farther away from the line segment relative to the axes of the counterparts. Therefore, when one of the two types of connection portions are gripped, with the line segment interposed therebetween, from the outer side by an arm or the like, and the gripped space is narrowed toward the line segment, the one of the two types of connection portions can be easily inserted and fitted in the other, in a state where the axes of the one of the two types of connection portions are substantially aligned with the axes of the other. Thus, productivity is improved.

In a second aspect (5), the present invention provides a method for manufacturing a sensor, the sensor including a sensor element extending in an axial direction, a plurality of metal terminals configured to be electrically connected to the sensor element, and a separator having a tubular shape, the separator being configured to surround a rear side of the sensor element and configured to hold the metal terminals, the separator including a front side separator and a rear side separator respectively disposed on a front side and a rear side in the direction of the axial line, the metal terminals each including a front side metal terminal and a rear side metal terminal respectively held by the front side separator and the rear side separator, a first connection portion being provided on a rear side of the front side metal terminal, the first connection portion being a male terminal or a female terminal, a second connection portion being provided on a front side of the rear side metal terminal, the second connection portion being a male terminal or a female terminal and serving as a counterpart terminal to be fitted to the first connection portion. The method comprising: a terminal insertion step of inserting the front side metal terminal into the front side separator and inserting the rear side metal terminal into the rear side separator; and a terminal fitting step of, after the terminal insertion step, assembling the rear side separator to a rear side of the front side separator, and, during the assembling, inserting one of the first connection portion and the second connection portion into the other of the first connection portion and the second connection portion, thereby assembling the front side metal terminal and the rear side metal terminal to each other. After the terminal fitting step, when the front side separator and the rear side separator are viewed with axes thereof aligned with each other, an axis of one of the first connection portion and the second connection portion, in all of the plurality of metal terminals, is displaced toward a radially outer side of the sensor element relative to an axis of a counterpart thereof, and the first connection portion and the second connection portion are in contact with each other.

In a preferred embodiment (6) of the method of manufacturing the sensor (5) above, after the terminal insertion step and before the terminal fitting step, when the front side separator and the rear side separator are viewed with the axes thereof aligned with each other, the axis of one of the first connection portion and the second connection portion, in all of the plurality of metal terminals, is displaced toward the radially outer side of the sensor element relative to the axis of the counterpart thereof.

In another preferred embodiment (7) of the method for manufacturing the sensor of (5) or (6) above, in the terminal fitting step, at least one of the first connection portion and the second connection portion is moved such that the axis of the first connection portion and the axis of the second connection portion are aligned with each other, and then one of the first connection portion and the second connection portion is inserted into the other of the first connection portion and the second connection portion.

Effects of the Invention

According to the present invention, a sensor that can easily and assuredly inhibit formation of a gap in the fitting portion of two metal terminals respectively held by two separators, can be obtained.

DESCRIPTION OF REFERENCE NUMERALS

Reference numerals used to identify various features in the drawings include the following.

1 sensor (gas sensor)
10 sensor element
30 front side metal terminal
33 first connection portion(connection portion)
40 rear side metal terminal
43 second connection portion(front end portion)
90 separator(front side separator)
95 separator(rear side separator)
O axial line
P1 axis of the first connection portion(connection portion)
P2 axis of the second connection portion(front end portion)
C contact portion
G center of gravity of the sensor element
LS line segment

DETAILED DESCRIPTION OF THE PREFERRED EMBODIMENTS

Hereinafter, an embodiment of the present invention will be described in greater detail with reference to the drawings. However, the present invention should not be construed as being limited thereto.

Figure 1:
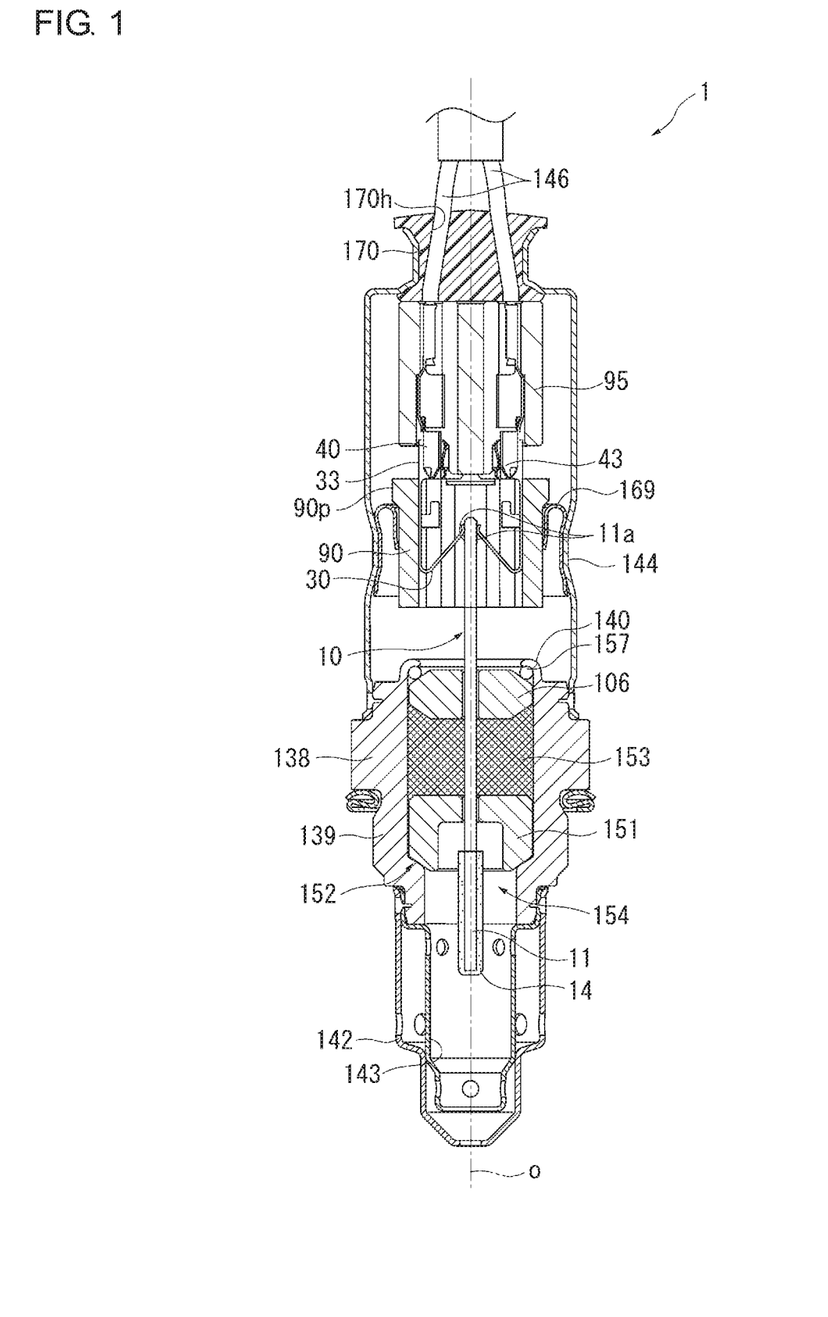
FIG. 1 is a cross-sectional view along an axial direction of a sensor according to an embodiment of the present invention.
Figure 2:
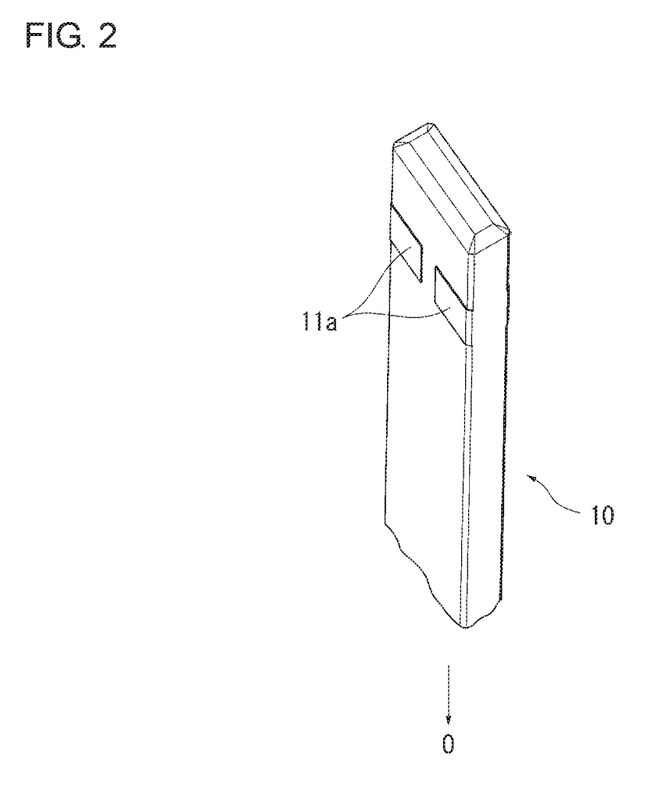
FIG. 2 is a perspective view of the rear side of a sensor element.
Figure 3A:
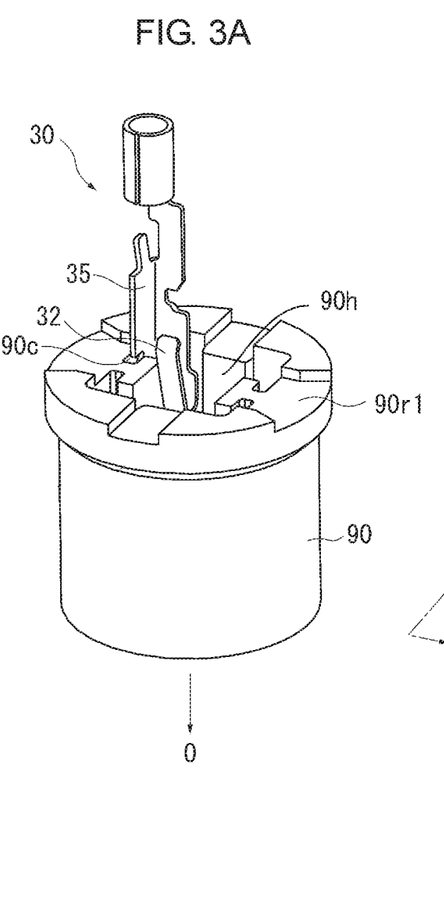
FIG. 3A is a view illustrating a process of causing a front side metal terminal to be held in a front side separator.
Figure 3B:
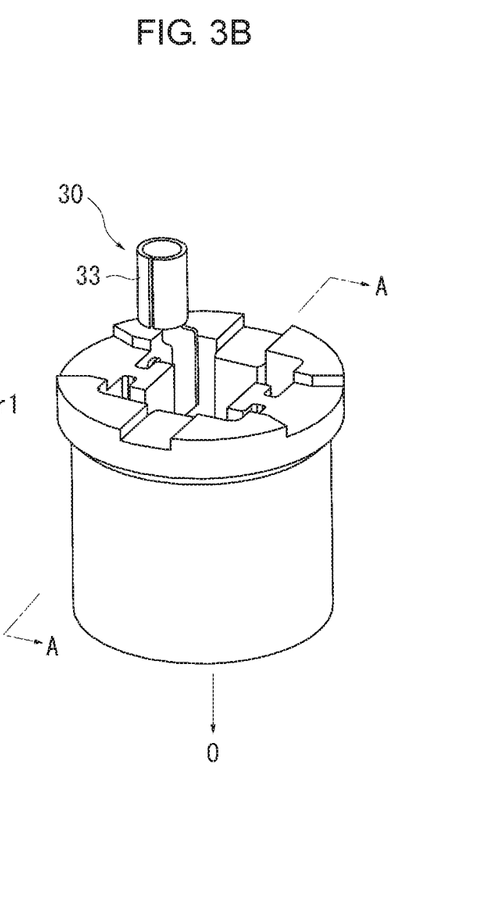
FIG. 3B is a view illustrating a process of causing the front side metal terminal to be held in the front side separator.
Figure 4A:
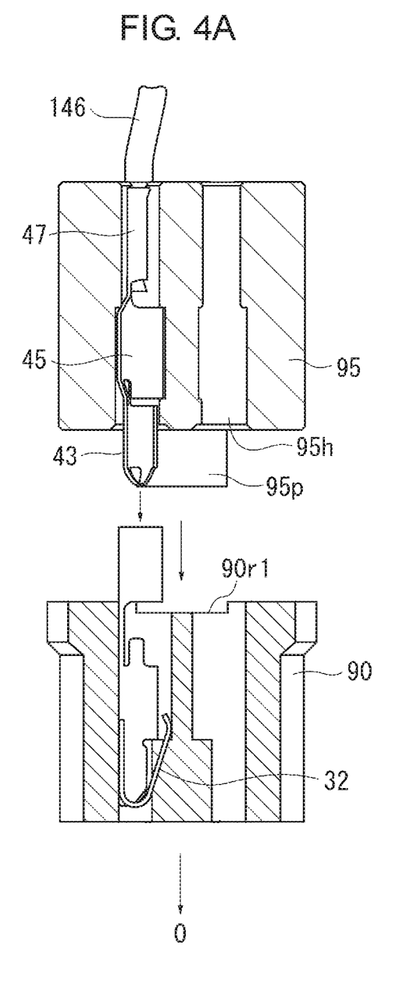
FIG. 4A is a view illustrating a process of assembling the front side separator and a rear side separator, as seen from a cross section along a line A-A in FIG. 3B.
Figure 4B:
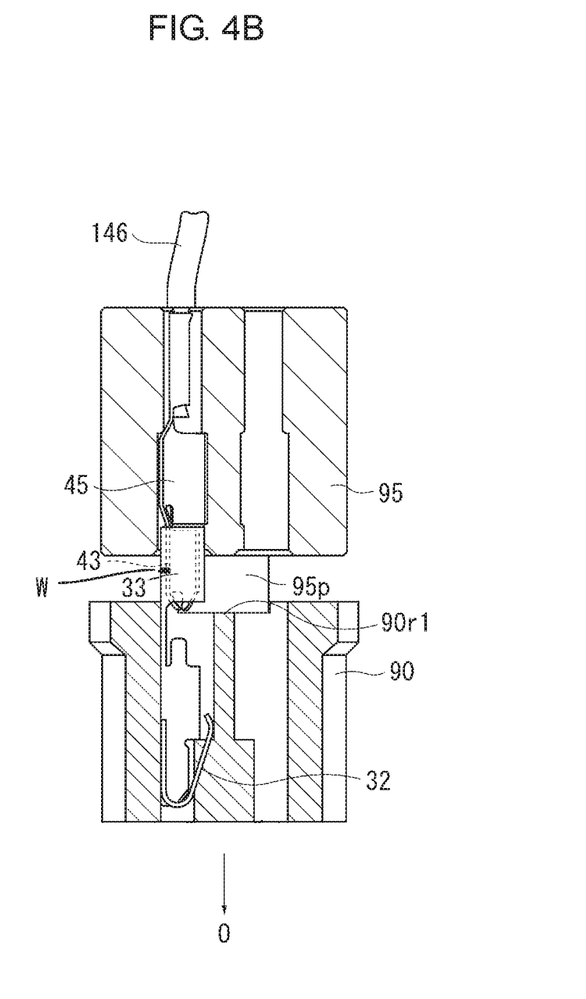
FIG. 4B is a view illustrating a process of assembling the front side separator and the rear side separator, as seen from a cross section along the line A-A in FIG. 3B.
Figure 5A:
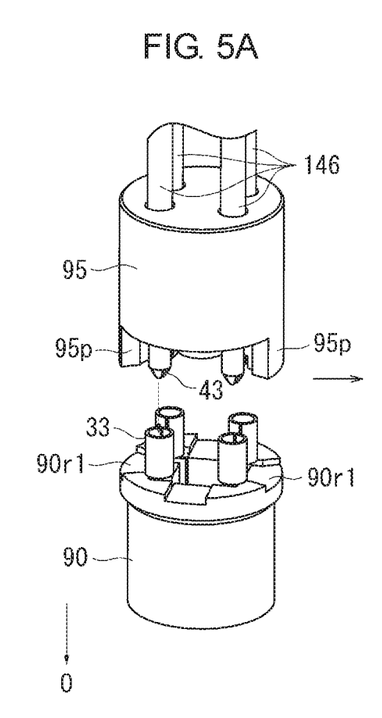
FIG. 5A is a perspective view illustrating assembling of the front side separator and the rear side separator.
Figure 5B:
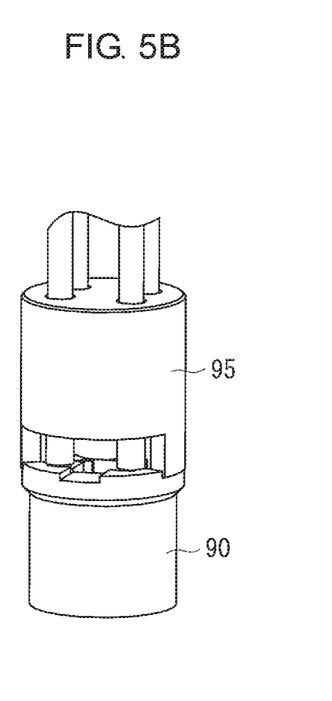
FIG. 5B is a perspective view illustrating assembling of the front side separator and the rear side separator.

FIG. 1 is a cross-sectional view along a direction of an axial line O of the entirety of a sensor (oxygen sensor) 1 according to an embodiment of the present invention. FIG. 2 is a perspective view of a sensor element 10. FIGS. 3A and 3B are views illustrating a process of causing a front side metal terminal 30 to be held in a front side separator 90. FIGS. 4A and 4B are views illustrating a process of assembling the front side separator 90 and a rear side separator 95, as seen from a cross section along a line A-A in FIG. 3B. FIGS. 5A and 5B are perspective views illustrating assembling of the front side separator 90 and the rear side separator 95.

The sensor 1 is an oxygen sensor that detects the oxygen concentration in exhaust gas of automobiles and various types of internal combustion engines.

In FIG. 1, the sensor 1 includes: a tubular metal shell 138 having a screw portion 139, for fixing to an exhaust pipe, formed on the outer surface of the metal shell 138; a sensor element 10 having a plate shape and extending in the direction of the axial line O (the longitudinal direction of the sensor 1: the up-down direction in the drawing); a tubular ceramic sleeve 106 disposed so as to surround the periphery of the sensor element 10 in the radial direction; a tubular ceramic front side separator 90 disposed so as to surround the periphery of a rear end portion of the sensor element 10 in an internal space on the front side of the front side separator 90; four front side metal terminals 30 (only two are shown in FIG. 1) held by the front side separator 90; a tubular ceramic rear side separator 95; and four rear side metal terminals 40 (only two are shown in FIG. 1) held by the rear side separator 95.

As described below, the rear side separator 95 is disposed so as to be in contact with the rear side of the front side separator 90 and is connected thereto.

Each front side metal terminal 30 and each rear side metal terminal 40 are disposed on the front side and the rear side, respectively, and are connected with each other.

As shown in FIG. 2, two electrode pads 11a are arranged in the width direction at each surface on the rear side of the sensor element 10.

Each electrode pad 11a can be formed as a sintered body formed from Pt as a main material, for example. Meanwhile, a gas detection portion 11 at the front end of the sensor element 10 is covered by a porous protection layer 14 such as alumina.

The metal shell 138 is made from stainless steel, and has a through hole 154 penetrating in the direction of the axial line. The metal shell 138 is formed in a substantially tubular shape having a ledge portion 152 projecting toward the radially inner side of the through hole 154. In the through hole 154, the sensor element 10 is disposed such that a front end portion of the sensor element 10 projects from the front end of the through hole 154. Further, the ledge portion 152 is formed as an inwardly tapered surface that is tilted with respect to a plane perpendicular to the direction of the axial line.

Inside the through hole 154 of the metal shell 138, a ceramic holder 151 made from alumina and having a substantially annular shape, a powder-filled layer 153 (hereinafter, also referred to as talc ring 153), and the above-described ceramic sleeve 106 are stacked in this order from the front side to the rear side so as to surround the periphery of the sensor element 10 in the radial direction.

A crimping packing 157 is disposed between the ceramic sleeve 106 and a rear end portion 140 of the metal shell 138. The rear end portion 140 of the metal shell 138 is crimped via the crimping packing 157 so as to press the ceramic sleeve 106 toward the front side.

Meanwhile, as shown in FIG. 1, an external protector 142 and an internal protector 143, which cover a projecting portion of the sensor element 10 and which are a dual protector made from metal (for example, stainless steel) and having a plurality of hole portions, are mounted to the outer periphery on the front side (lower side in FIG. 1) of the metal shell 138 by welding or the like.

An outer casing 144 is fixed to the outer periphery on the rear side of the metal shell 138. Lead wires 146 are connected to the rear sides of the respective rear side metal terminals 40, and the lead wires 146 are drawn out rearward of the rear side separator 95.

A grommet 170 made from rubber is disposed at an opening portion on the rear side (upper side in FIG. 1) of the outer casing 144. The grommet 170 has formed therein lead wire insertion holes 170h through which four lead wires 146 (only two are shown in FIG. 1) drawn out from the rear side separator 95 are inserted.

The front side separator 90 is disposed on the rear side (upper side in FIG. 1), of the sensor element 10, projecting from the rear end portion 140 of the metal shell 138. The front side separator 90 is provided with a flange portion 90p projecting from the outer surface thereof toward the radially outer side. The front side separator 90 is held inside the outer casing 144 as a result of the flange portion 90p being in contact with the outer casing 144 via a holding member 169.

The rear side separator 95 is disposed between the grommet 170 and the front side separator 90. By the elastic force of the grommet 170, the rear side separator 95 presses the front side separator 90 toward the front side. Accordingly, the flange portion 90p is pressed toward the holding member 169 side, whereby the front side separator 90 and the rear side separator 95 are held in a state of being connected to each other inside the outer casing 144 (i.e., without being separated in the direction of the axial line O).

As shown in FIGS. 3A and 3B, a rectangular element hole 90h penetrating in the direction of the axial line is formed at the center of the front side separator 90. Four grooves 90c are formed so as to surround the element hole 90h from four corners on the radially outer side. When a front side metal terminal 30 is inserted into a groove 90c from the rear side (FIG. 3A), the front side metal terminal 30 is held in the front side separator 90 (FIG. 3B).

In this manner, the element hole 90h surrounds the rear side of the sensor element 10. Further, the front side metal terminals 30 held in the respective grooves 90c face the element hole 90h so as to be opposed to the outer surface on the rear side of the sensor element 10 and come into contact with the electrode pads 11a (see FIG. 2) formed on the outer surface of the sensor element 10, thereby being electrically connected to the electrode pads 11a.

As shown in FIGS. 3A and 3B, the front side metal terminal 30, as a whole, extends in the direction of the axial line O. The front side metal terminal 30 integrally includes: a connection portion 33 to be connected to a rear side metal terminal 40; a body portion 35 having an L shape in cross section and continuous with the front side of the connection portion 33; and an elastic portion 32 bent toward the sensor element 10 at the front side of the body portion 35. The body portion 35 is inserted and held in a groove 90c. The elastic portion 32 is elastically connected to an electrode pad 11a. As for the four front side metal terminals 30, front side metal terminals 30 that are adjacent to each other in the front side separator 90 have shapes that are in line symmetry.

In a state where the front side metal terminal 30 is held in the front side separator 90, the connection portion 33 projects rearward of the front side separator 90 (FIG. 3B).

As shown in FIG. 4A, the rear side metal terminal 40, as a whole, extends in the direction of the axial line O. The rear side metal terminal 40 integrally includes: a crimped terminal portion 47 to be connected to the lead wire 146 on the rear side; a cylindrical large-diameter portion 45 having a C shape in a cross section on the front side of the crimped terminal portion 47; and a cylindrical front end portion 43 having a C shape in a cross section and continuous with the front side of the large-diameter portion 45.

The front side metal terminal 30 and the rear side metal terminal 40 can each be manufactured by, for example, stamping one sheet of a metal plate (SUS304, etc.) and bending the stamped metal plate into a predetermined shape. However, the present invention is not limited thereto.

The rear side separator 95 has a cylindrical shape in which four insertion holes 95h are arranged in the circumferential direction, and the rear side metal terminals 40 are inserted and held in the insertion holes (FIG. 4A).

At this time, the front side of the front end portion 43 of the rear side metal terminal 40 projects from the frontward facing surface of the rear side separator 95.

The connection portion 33 and the front end portion 43 correspond to "first connection portion" and "second connection portion", respectively. In the present example, the connection portion 33 and the front end portion 43 are a female terminal and a male terminal, respectively.

As shown in FIGS. 3A and 3B, two recesses 90r1 are formed on the rearward facing surface of the front side separator 90.

In addition, as shown in FIGS. 4A and 4B, two protrusions 95p protruding along the width direction of the sensor element 10 are formed on the outer periphery side of the frontward facing surface of the rear side separator 95.

As shown in FIG. 5A, in this state, the rear side separator 95 is disposed on the rear side of the front side separator 90 in the direction of the axial line O, the protrusions 95p of the rear side separator 95 are caused to engage with the recesses 90r1 of the front side separator 90, and the front side separator 90 and the rear side separator 95 are interposed and held between the holding member 169 and the grommet 170 in FIG. 1, whereby the front side separator 90 and the rear side separator 95 are connected to each other (FIG. 4B, FIG. 5B).

At this time, the front end portion 43 of each rear side metal terminal 40 projecting frontward of the rear side separator 95 is inserted and fitted in the cylindrical connection portion 33 having a C shape in a cross section of a corresponding front side metal terminal 30 projecting rearward of the front side separator 90. Accordingly, the metal terminals are electrically connected to each other. In this case, the front side metal terminal 30 is indirectly connected to the lead wire 146 via the rear side metal terminal 40.

As shown in FIG. 4B, the connection portions of the metal terminals 30, 40 are welded at the welded portion W. As the welding, spot welding or laser welding can be performed, for example.

Next, with reference to FIG. 6 and FIG. 7, a characteristic feature of the present invention will be described.

Figure 6:
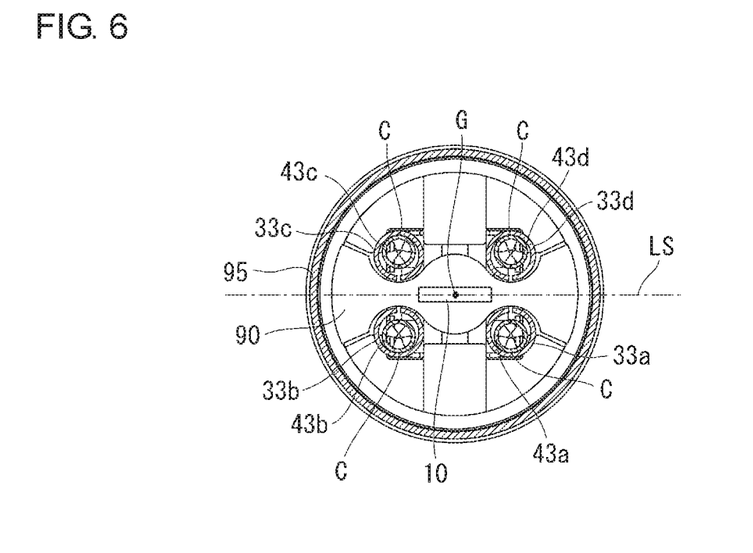
FIG. 6 is a plan view illustrating a positional relationship between front end portions and connection portions after the front side separator and the rear side separator have been assembled.

As shown in FIG. 6, when viewed from the rear side in the direction of the axial line O, with respect to the four (all) front end portions 43 and the four (all) counterpart connection portions 33 of the plurality of metal terminals 30, 40, the lower right combination is provided with a reference character "a", and then, clockwise, the lower left combination is provided with a reference character "b", the upper left combination is provided with a reference character "c", and the upper right combination is provided with a reference character "d" (33a, 33b, 33c and 33d, respectively).

Figure 7:
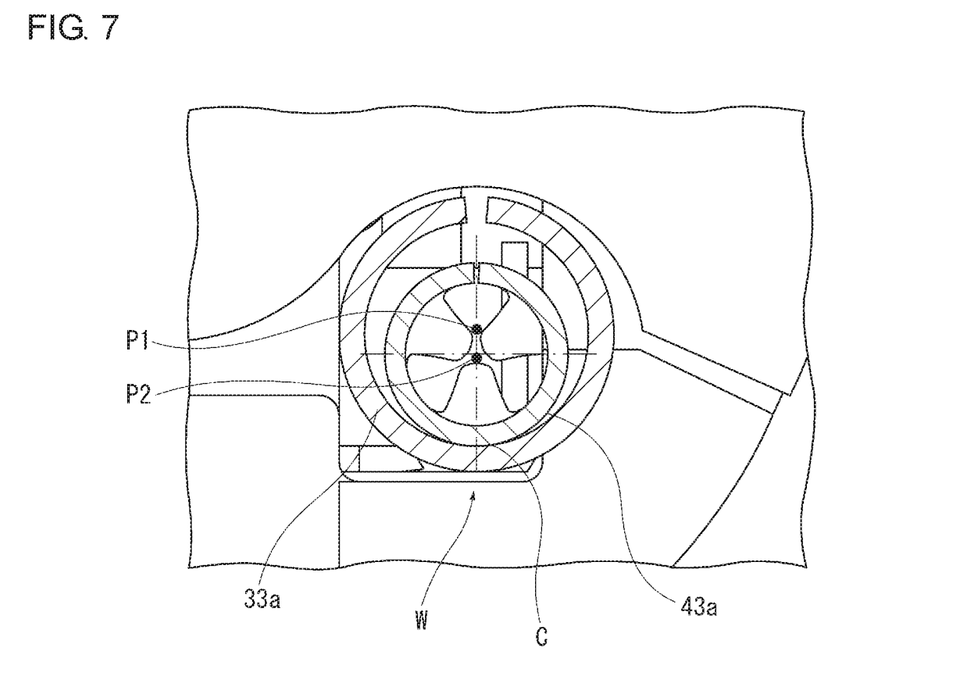
FIG. 7 is a partially enlarged view of FIG. 6.

At this time, as shown in FIG. 7, an axis P2 of the front end portion 43a is displaced toward the radially outer side (lower side in FIG. 7) of the sensor element 10 relative to an axis P1 of the counterpart connection portion 33a, and the outer surface of the front end portion 43a is in contact at a contact portion C with the inner surface of the connection portion 33a.

Similarly, as shown in FIG. 6, the axis of the front end portion 43b is also displaced toward the radially outer side (lower side in FIG. 7) of the sensor element 10 relative to the axis of the counterpart connection portion 33b, and both are in contact with each other. The axis of the front end portion 43c is also displaced toward the radially outer side (upper side in FIG. 7) of the sensor element 10 relative to the axis of the counterpart connection portion 33c, and both are in contact with each other. The axis of the front end portion 43d is also displaced toward the radially outer side (upper side in FIG. 7) of the sensor element 10 relative to the axis of the counterpart connection portion 33d, and both are in contact with each other.

In this manner, the axis of the front end portion 43, in all of the plurality of metal terminals 30, 40, is displaced toward the radially outer side of the sensor element 10 relative to the axis of the counterpart connection portion 33, and both are in contact with each other. Therefore, formation of a gap in the fitting portion of the metal terminals 30 and 40 can be easily and assuredly inhibited. As a result, connection reliability of the metal terminals 30 and 40 can be improved, and when the metal terminals 30 and 40 are to be welded, welding can be assuredly performed.

In the present embodiment, the axis of the front end portion 43 which is the male terminal is displaced toward the radially outer side of the sensor element 10 relative to the axis of the counterpart connection portion 33. With this configuration, the front end portion 43 which is the male terminal being on the inner side of the connection portion 33 which is the female terminal, is positioned closer to the radially outer side. Thus, as shown in FIG. 4B, the contact portion C faces the radially outer side without fail. Therefore, even when the plurality of metal terminals 30, 40 are arranged, each contact portion C faces the outer side. Thus, when the contact portion C is to be welded, the welding operation does not interfere with another metal terminal 30, 40, and welding can be easily performed.

Figure 8:
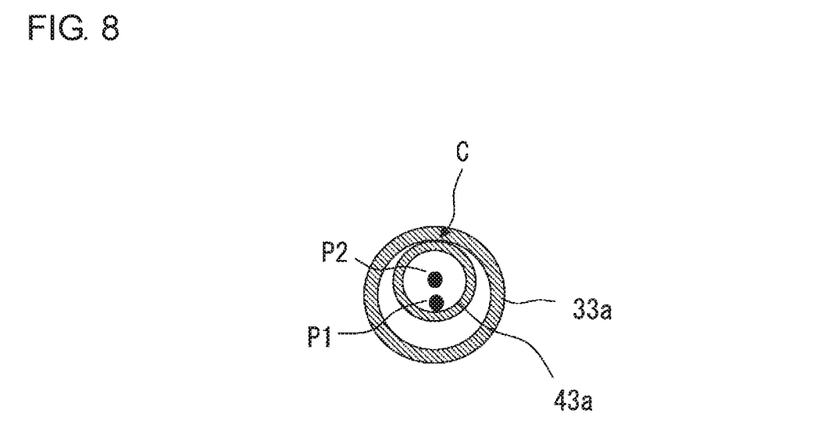
FIG. 8 is a plan view illustrating a positional relationship when the axis of a connection portion being a female terminal is displaced toward the radially outer side relative to the axis of a front end portion.

In contrast, as shown in FIG. 8, when the axis P1 of the connection portion 33a, as the connection portion 33 which is the female terminal, being in the same positional relationship with that in FIG. 6 is displaced toward the radially outer side of the sensor element 10 relative to the axis P2 of the counterpart front end portion 43, the contact portion C faces the radially inner side of the sensor element 10. This also applies to the other connection portions 33, and when the contact portion C of the metal terminals 30, 40 is to be welded, the inner side portions thereof need to be welded. This could cause interference with other metal terminals 30, 40, resulting in difficulty in welding.

In the present embodiment, as shown in FIG. 6, when viewed in the direction of the axial line O, when a line segment LS in the horizontal direction that passes through the center of gravity G of the sensor element 10 and that does not pass through any of the front end portions 43 and the connection portions 33, all of the axes of the front end portions 43 are displaced so as to be away from the line segment LS relative to the axes of the counterpart connection portions 33.

Specifically, the axes of the front end portions 43a, 43b are on the lower side of the line segment LS relative to the axes of the counterpart connection portions 33a, 33b. Meanwhile, the axes of the front end portions 43c, 43d are on the upper side of the line segment LS relative to the axes of the counterpart connection portions 33c, 33d. Thus, the axes of the front end portions 43a to 43d are positioned away, in the up-down direction with respect to the line segment LS, from the axes of the counterpart connection portions 33a to 33d.

Figure 9A:
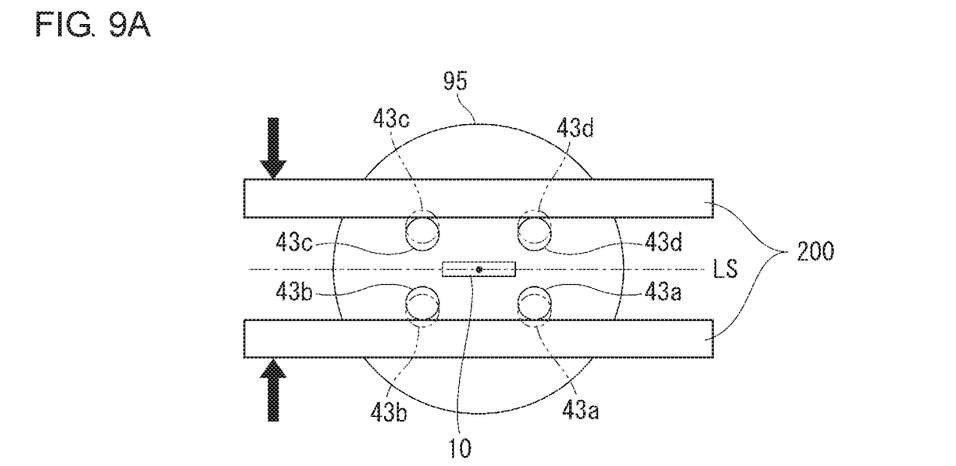
FIG. 9A is a view illustrating a step of fitting front end portions inserted in the rear side separator, to connection portions inserted in the front side separator.

With this configuration, as shown in FIG. 9A, when the front end portions 43a to 43d are gripped from the outer side by a predetermined arm 200 or the like in the up-down direction with respect to the line segment LS, and the arm 200 or the like is pressed so as to narrow the gripped space toward the line segment LS, the front end portions 43a to 43d are moved so as to be close to the line segment LS. Specifically, the front end portions 43a to 43d elastically bend from the positions indicated by the broken lines before the pressing, to the positions indicated by the solid lines.

Figure 9B:
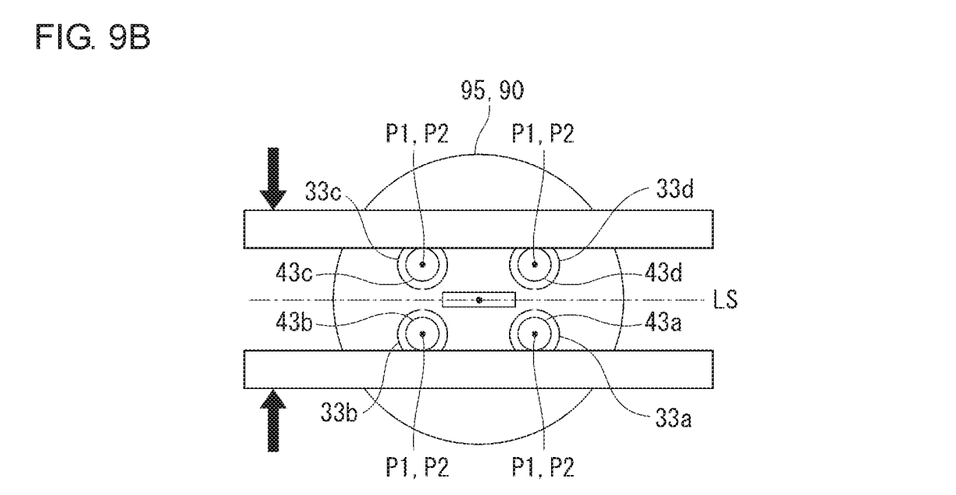
FIG. 9B is a view illustrating a step of fitting the front end portions inserted in the rear side separator, to the connection portions inserted in the front side separator.

Then, in this state, as shown in FIG. 9B, when the rear side separator 95 including the front end portions 43a to 43d is disposed on the rear side of the front side separator 90, and the front end portions 43a to 43d are inserted and fitted in the respective counterpart connection portions 33a to 33d, the axes P1 and the axes P2 thereof are aligned with each other. Thus, the front end portions 43a to 43d can be easily inserted and fitted into the respective counterpart connection portions 33a to 33d.

Figure 9C:
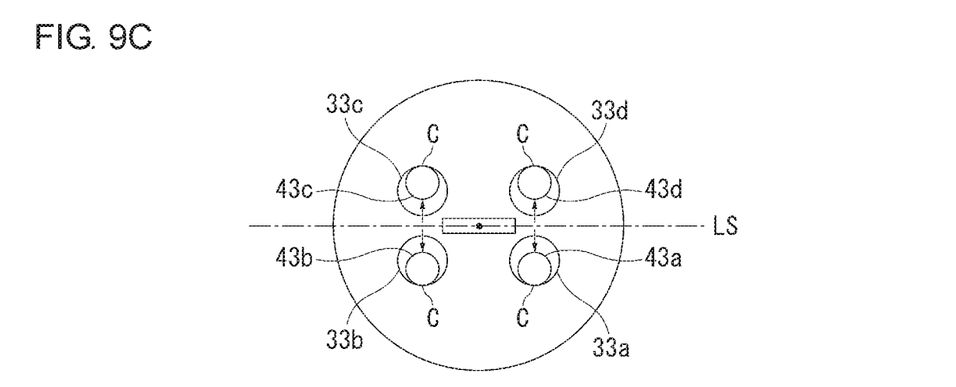
FIG. 9C is a view illustrating a step of fitting the front end portions inserted in the rear side separator, to the connection portions inserted in the front side separator.

Then, as shown in FIG. 9C, when the arm 200 is removed, the front end portions 43a to 43d elastically return, in the respective counterpart connection portions 33a to 33d, so as to move away from the line segment LS. At this time, the axis P2 of each front end portion 43a to 43d is displaced toward the radially outer side of the sensor element 10 relative to the axis P1 of the counterpart connection portion 33a to 33d, and both come into contact with each other at the contact portion C.

That is, when the line segment LS is drawn, all of the axes of the front end portions 43 are displaced so as to be farther away from the line segment LS relative to the axes of the counterpart connection portions 33. Therefore, when the front end portions 43 are gripped, with the line segment LS interposed therebetween, from the outer side by the arm 200 or the like, and the gripped space is narrowed toward the line segment LS, the front end portions 43 can be easily inserted and fitted into the connection portions 33 in a state in which the axes of the front end portions 43 are substantially aligned with the axes of the connection portions 33. Thus, productivity is improved.

A method for manufacturing the sensor according to the embodiment of the present invention includes at least: a terminal insertion step of inserting the front side metal terminals 30 into the front side separator 90 and inserting the rear side metal terminals 40 into the rear side separator 95; and a terminal fitting step of, after the terminal insertion step, in a state where the axis of the front side separator 90 and the axis of the rear side separator 95 are aligned with each other, assembling the rear side separator 95 to the rear side of the front side separator 90, and, during the assembling, inserting the front end portions 43 into the connection portions 33, thereby assembling the front side metal terminals 30 and the rear side metal terminals 40 to each other.

In the method for manufacturing the sensor according to the embodiment of the present invention, after the terminal fitting step, when the front side separator 90 and the rear side separator 95 are viewed with the axes thereof aligned with each other, the axis of the front end portion 43, in all of the plurality of metal terminals 30, 40, is displaced toward the radially outer side of the sensor element 10 relative to the axis of the counterpart connection portion 33.

Accordingly, when the front end portion 43 of which the axis is displaced relative to that of the counterpart connection portion 33 is inserted (inserted and fitted) into the connection portion 33, the front end portion 43 displaced as described above comes into contact at the contact portion C with the connection portion 33. Thus, formation of a gap in the fitting portion of the metal terminals 30 and 40 can be easily and assuredly inhibited.

In the method for manufacturing the sensor according to the embodiment of the present invention, after the terminal insertion step and before the terminal fitting step, even when the front side separator 90 and the rear side separator 95 are viewed with the axes thereof aligned with each other, the axis of the front end portion 43, in all of the plurality of metal terminals 30, 40, is displaced toward the radially outer side of the sensor element 10 relative to the axis of the counterpart connection portion 33.

Thus, as shown in FIGS. 9A, 9B, and 9C, since the axes of the front end portions 43 are displaced in a specific direction (radially outer side in the present example) in advance, when the terminal fitting step is performed, the front end portions 43 can be easily inserted into the connection portions 33, simply by pressing the front end portions 43 by the arm 200 or the like in a certain direction (toward the radially inner side in the present example). In addition, since the front end portions 43 are aligned in a given direction, all of the pressing amounts of the arm 200 only need to be set to be in the positive direction, for example. Thus, adjustment of the pressing amount and designing of the production equipment are facilitated.

In contrast, if, in a state before the terminal fitting step, the axes of the front end portions 43 are not aligned in the same direction relative to those of the connection portions 33 (for example, the axes of some front end portions 43 are on the radially outer side, and the axes of the other front end portions 43 are on the radially inner side), some front end portions 43 would need to be pressed by the arm 200 and the other front end portions 43 need to be pulled in the opposite direction by the arm 200. In addition, the pressing (pulling back) amount of the arm 200 is not constant because the arm 200 needs to be pressed or pulled back. Further, influence of variation in the moving amount of the arm 200 on the terminal moving amount necessary for alignment is increased. Thus, adjustment in the accuracy in the moving amount of the arm 200 becomes difficult.

In the method for manufacturing the sensor according to the embodiment of the present invention, as shown in FIGS. 9A, 9B, and 9C, in the terminal fitting step, the front end portion 43 may be moved (moved from the position indicated by the broken line before pressing, to the position indicated by the solid line, shown in FIG. 9A) such that the axis P1 of the front end portion 43 and the axis P2 of the connection portion 33 are aligned with each other, and then the front end portion 43 may be inserted into the connection portion 33.

Accordingly, as described above, the front end portion 43 can be easily inserted and fitted in the connection portion 33 in a state where the axis of the front end portion 43 is substantially aligned with the axis of the connection portion 33. Thus, productivity is improved.

The present invention is not limited to the above embodiment, and includes various modifications and equivalents encompassed within the concept and scope of the present invention.

The shapes and the like of each metal terminal and each separator are not limited to those described in the above embodiment.

The connection (coupling) structure between the rear side metal terminal and the front side metal terminal is not limited to that described above. For example, the rear side of the front side metal terminal may have a shape of a male pin, and the male pin may be inserted and fitted in a tubular portion on the front side of the rear side metal terminal.

When the rear side of the front side metal terminal or the front side of the rear side metal terminal is formed in a tubular shape, the tubular shape is not limited to a cylindrical shape and may be a polygonal tube such as a quadrangular tube. In addition, the tube may not necessarily be completely closed, and may be formed as at least a part of a tube (in a C shape, for example). The tube of one of the front side metal terminal and the rear side metal terminal may be in the form of a column or a part of a column.

The rear side metal terminal and the front side metal terminal only need to be fitted to each other, and welding thereof is not necessarily required.

The invention is not limited to a particular type of sensor, and, other than the gas sensor, may be a temperature sensor or a water quality sensor. Examples of the gas sensor, in addition to the oxygen sensor, include a NOx sensor and a wide range sensor.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2019-145359 filed Aug. 7, 2019, incorporated herein by reference in its entirety.

What is claimed is:

1. A sensor comprising:
a sensor element extending in an axial direction;
a plurality of metal terminals configured to be electrically connected to the sensor element; and
a separator having a tubular shape, the separator being configured to surround a rear side of the sensor element and configured to hold the metal terminals, wherein
the separator includes a front side separator and a rear side separator respectively disposed on a front side and a rear side in the axial direction,
the metal terminals each include a front side metal terminal and a rear side metal terminal respectively held by the front side separator and the rear side separator,
a first connection portion that is a male terminal or a female terminal is provided on a rear side of the front side metal terminal,
a second connection portion that is a male terminal or a female terminal and that serves as a counterpart terminal to be fitted to the first connection portion is provided on a front side of the rear side metal terminal, and
a central axis in the axial direction of one of the first connection portion and the second connection portion, in all of the plurality of metal terminals, is displaced toward a radially outer side of the sensor element relative to a central axis in the axial direction of a counterpart thereof, and the first connection portion and the second connection portion are in contact with each other at only along a contact line extending in the axial direction of the first connection portion.

2. The sensor as claimed in claim 1, wherein
one of each first connection portion and each second connection portion is the male terminal, and a central axis in the axial direction of the male terminal, in all of the plurality of metal terminals, is displaced toward the radially outer side relative to a central axis in the axial direction of a counterpart thereof.

3. The sensor as claimed in claim 2, wherein
the first connection portion and the second connection portion are welded to each other at the contact line.

4. The sensor as claimed in claim 1, wherein
when, viewed in the axial direction, a predetermined line segment that passes through a center of gravity of the sensor element and that does not pass through the first connection portion and the second connection portion is drawn, the central axis of one of the first connection portion and the second connection portion is displaced so as to be farther away from the line segment relative to the central axis of the counterpart thereof.

5. The sensor as claimed in claim 1, wherein the first connection portion has a circular or polygonal cross section in a direction perpendicular to the axial direction, and the second connection portion has a circular or polygonal cross section in a direction perpendicular to the axial direction.

6. A method for manufacturing a sensor,
the sensor including
a sensor element extending in an axial direction,
a plurality of metal terminals configured to be electrically connected to the sensor element, and
a separator having a tubular shape, the separator being configured to surround a rear side of the sensor element and configured to hold the metal terminals,
the separator including a front side separator and a rear side separator respectively disposed on a front side and a rear side in the axial direction,
the metal terminals each including a front side metal terminal and a rear side metal terminal respectively held by the front side separator and the rear side separator,
a first connection portion being provided on a rear side of the front side metal terminal, the first connection portion being a male terminal or a female terminal,
a second connection portion being provided on a front side of the rear side metal terminal, the second connection portion being a male terminal or a female terminal and serving as a counterpart terminal to be fitted to the first connection portion,
the method comprising:
a terminal insertion step of inserting the front side metal terminal into the front side separator and inserting the rear side metal terminal into the rear side separator; and
a terminal fitting step of, after the terminal insertion step, assembling the rear side separator to a rear side of the front side separator, and, during the assembling, inserting one of the first connection portion and the second connection portion into the other of the first connection portion and the second connection portion, thereby assembling the front side metal terminal and the rear side metal terminal to each other, wherein after the terminal fitting step, when the front side separator and the rear side separator are viewed with axes thereof aligned with each other, a central axis in the axial direction of one of the first connection portion and the second connection portion, in all of the plurality of metal terminals, is displaced toward a radially outer side of the sensor element relative to a central axis in the axial direction of a counterpart thereof, and the first connection portion and the second connection portion are in contact with each other at only along a contact line extending in the axial direction of the first connection portion.

7. The method for manufacturing the sensor as claimed in claim 6, wherein after the terminal insertion step and before the terminal fitting step, when the front side separator and the rear side separator are viewed with the axes thereof aligned with each other, the central axis of one of the first connection portion and the second connection portion, in all of the plurality of metal terminals, is displaced toward the radially outer side of the sensor element relative to the central axis of the counterpart thereof.

8. The method for manufacturing the sensor as claimed in claim 6, wherein in the terminal fitting step, at least one of the first connection portion and the second connection portion is moved such that the central axis of the first connection portion and the central axis of the second connection portion are aligned with each other, and then one of the first connection portion and the second connection portion is inserted into the other of the first connection portion and the second connection portion.

9. The method for manufacturing the sensor as claimed in claim 6, wherein the first connection portion has a circular or polygonal cross section in a direction perpendicular to the axial direction, and the second connection portion has a circular or polygonal cross section in a direction perpendicular to the axial direction.

* * * * *